May 30, 1933.　　　　G. H. TABER　　　　1,911,725
WHEEL ALIGNMENT GAUGE
Filed Aug. 3, 1927　　　2 Sheets-Sheet 2
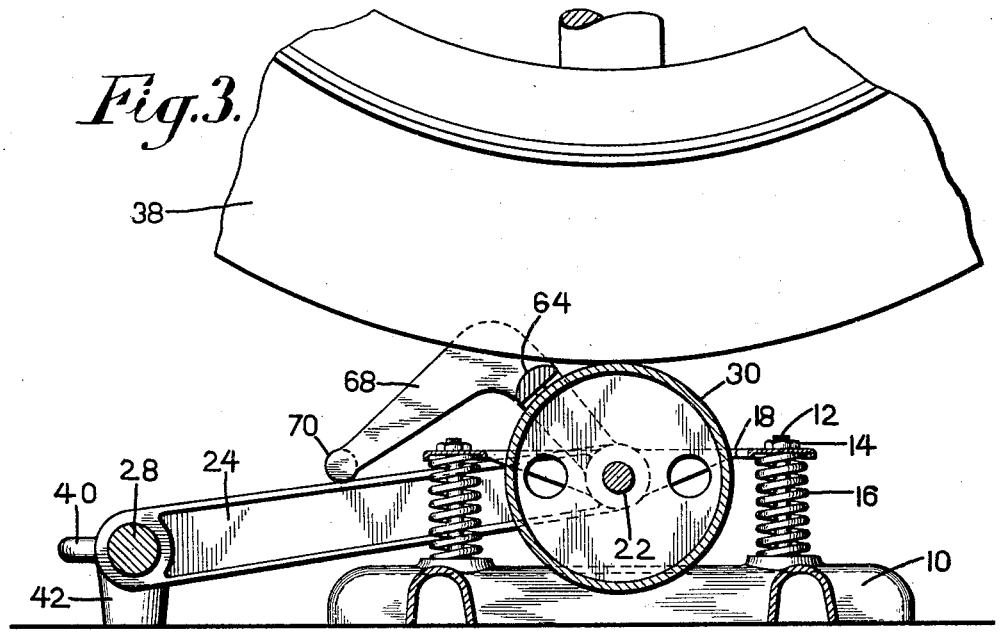
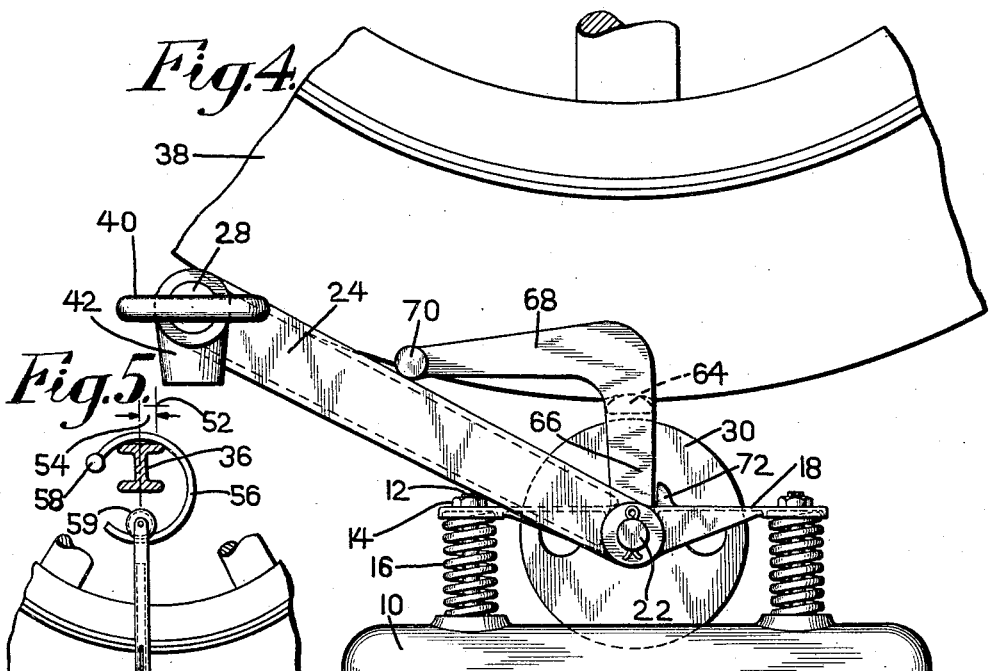
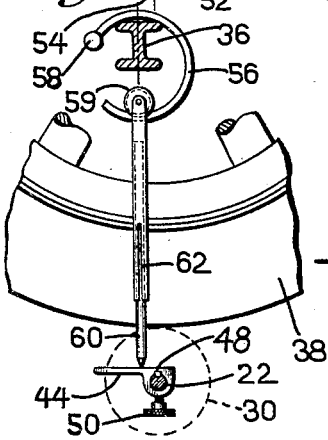
Inventor
G. H. Taber
By his Attorneys
Cooper, Kerr & Dunham Patented May 30, 1933

1,911,725

UNITED STATES PATENT OFFICE

GEORGE H. TABER, OF BINGHAMTON, NEW YORK

WHEEL ALIGNMENT GAUGE

Application filed August 3, 1927. Serial No. 210,236.

This invention pertains to vehicle wheel gauges, especially those adapted for determining whether or not the front wheels of an automobile are out of running alignment, and if so, how much they are out of alignment.

The invention may be used for gauging or aligning front or rear wheels of a wide variety of vehicles, but inasmuch as the principal field of usefulness of the device is in connection with the front wheels of automobiles, I shall describe an arrangement of my invention especially adapted for that particular purpose.

The checking of the alignment of front wheels of automobiles is difficult because of the fact that the wheels are usually set with "camber", "toe-in", and the steering spindle is set with "rake"—therefore it is very difficult to make proper measurements for the purpose of checking the wheel alignment. The difficulty is aggravated by the fact that the tires themselves are not true on their sides and are often not even true in diameter.

With those difficulties in mind, attempts have been made to determine the condition of wheel alignment by rolling the wheel and noting the effect of the rolling action on indicating devices provided for the purpose. So far as I am aware none of those arrangements has been satisfactory.

One of the features of the problem is the fact that the tires on automobiles are comparatively soft and are deformed considerably out of shape when any appreciable amount of the weight of the car rests on them. The deformation is pronounced when the tires rest on a flat floor, but is even more pronounced when they rest on rollers of comparatively small diameter, as is the case in some previous gauges designed in the attempt to obtain indications as to alignment conditions.

The principal object of the present invention is to overcome the above difficulties by providing an apparatus with which wheel alignment may be checked by rolling the wheel while its tire is undeformed.

Another object is to provide a device which may be easily set in proper position relatively to the wheels to be tested, whereby correct results may be obtained.

Another object is to so design the apparatus that its proper operation is not prevented by excessive friction of its parts, as is often the case when the weight of the automobile rests on the device.

Further and other objects and advantages will be hereinafter set forth in the accompanying specification and claims, and shown in the drawings, which by way of illustration show what is now considered to be the preferred embodiment of the invention.

Figs. 3 and 4 are enlarged side views of the device showing operation of the device for temporarily preventing contact between the tire and the roller of the device.

Fig. 5 is an enlarged side view of the locating indicator.

Figure 1:
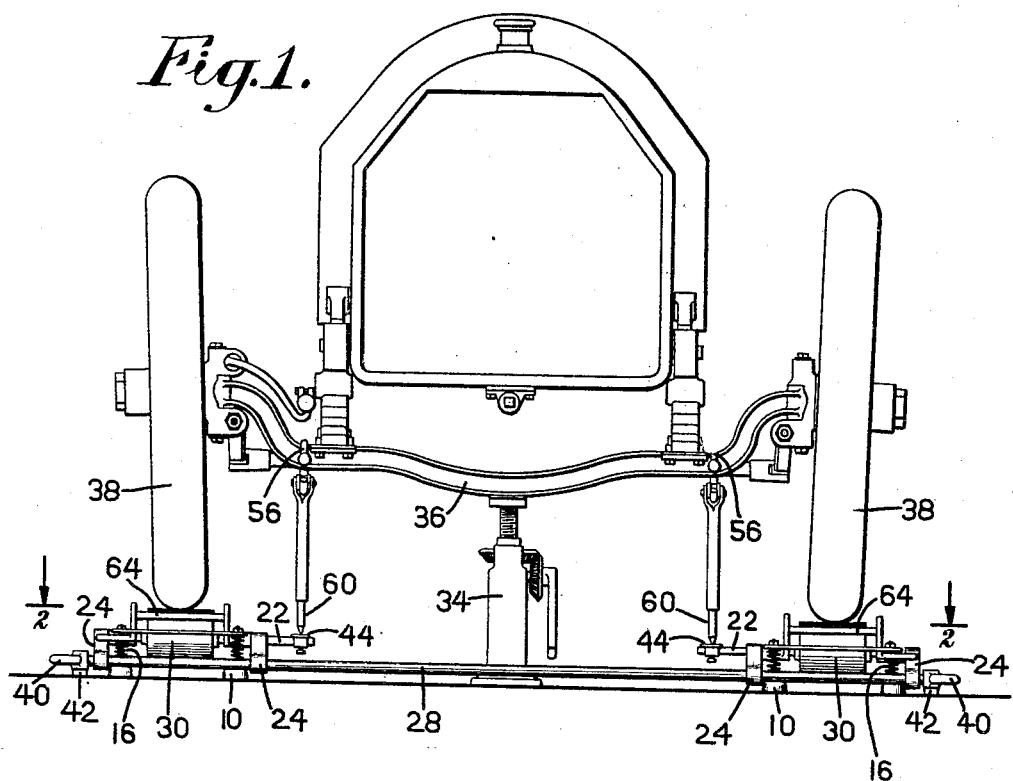
Fig. 1 is a front view of the device in position under the front wheels of an automobile.

In practice, for convenience and to gain speed, I use two exactly similar devices, one under each front wheel of the car, and have so illustrated my method. However, it is quite possible to obtain correct results by the use of only one device, placing it first under one wheel and then under the other.

Each device comprises (Figs. 2 and 3) a frame 10 which rests on the floor. Set vertically in frame 10 toward the corners thereof are four bolts or studs 12, on the upper ends of which are threaded nuts 14. Surrounding each stud 12 is a helical compression spring 16. Resting on springs 16 is a horizontal cradle member 18. Cradle 18 is provided with holes through which pass studs 12. Nuts 14 are above cradle 18 and serve to limit the movement of the cradle when it is pressed upwardly by the springs.

Passing through bosses 20 of cradle 18 and pinned thereto is a shaft 22. Mounted freely on each end of shaft 22 adjacent boss 20 is a connecting rod 24. A pin 26 through the shaft serves to keep arm 24 in close contact with bearing 20, thereby preventing endwise movement of shaft 22. The other ends of connecting rods 24 are drilled to receive a rod 28, which when in position is parallel to shaft 22.

Mounted for free rotation on shaft 22 within cradle 18 is a drum 30. The length of drum 30 is such that it is free to move lengthwise on shaft 22 within the confines of cradle 18.

Attached to a portion of the cradle provided for the purpose is a graduated scale or chart 32. The chart is preferably graduated both ways from a central zero which is opposite one end of roller 30 when the roller is in mid position, lengthwise, on shaft 22.

To prepare the device for use, jack 34 is placed under the middle of the front axle 36 of the car to be tested. By means of the jack the front of the car is raised sufficiently so that one of my gauging devices may be placed under each front wheel 38 (Fig. 1). By means of the jack the car is then lowered until a tire of each wheel 38 is resting on one of the drums 30 and compressing springs 16. It will be apparent that the only pressure between the tire and roller 30 is due to springs 16. Roller 30 is therefore held in resilient contact with the tire. The degree of compression of the springs, and therefore the pressure between tire and roller, may be controlled by means of the jack.

The two devices are held in alignment by bar 28 passing through the free ends of the pair of connecting rods 24 on each device. Each end of bar 28 is provided with a hand grip 40 which has a downwardly projecting strut 42 to hold bar 28 and handles 40 at a convenient height from the floor.

The end of each shaft 22 projecting toward the center of the car is extended to support a perch 44 which is provided on its flat upper surface with a graduated chart or scale 46. Perch 44 is splined on a key 48 set into shaft 22 so that the perch and chart may be moved lengthwise of shaft 22 but not rotated thereon. A set screw 50 holds perch 44 in any desired position.

In order to function properly shaft 22 of my device must be directly underneath the center of the wheel to be tested. Steering spindles are usually set with "rake", that is, they slope with their bottom ends further toward the front of the car than their upper ends. As a result of such construction, which is well known to those experienced with automobiles, the center of a front wheel is not in vertical alignment with the center of the front axle, but is to the rear thereof. For instance, in Fig. 5 the center 52 of wheel 38 is to the rear of the vertical center line of axle 36 by a distance 54.

Distance 54 is the same on all cars of the same model, and once that distance is known I provide a simple plumbing device which will now be described, by means of which shaft 22 may readily be set in proper position.

I hang on the axle an open-sided circular ring 56, made preferably of round stock and provided at 58 with a weight to compensate for the material moved from that side of the ring. Running free on the inside of ring 56 is a grooved roller 59 from the center of which is freely suspended the pointer 60, provided at 62 with a telescopic joint to permit change of length. Pointer 60 hangs directly under the center of the axle, and the operator moves the gauging devices on the floor, or moves the car relatively to the gauging devices, until the indication of pointer 60 on chart 46 shows that shaft 22 is directly underneath wheel center 52, whereupon the device is ready for use.

Then if a wheel 38 be rotated by hand, and if its line of rotation, i. e., its line of travel if it were free to travel, is at right angles with shaft 22, drum 30 will simply rotate on shaft 22 and will not move lengthwise thereon. But if the direction of rotation is not at right angles to shaft 22, drum 30 will not only rotate but will spiral lengthwise on shaft 22. The amount and direction of lengthwise movement of the drum, as shown on chart 32, when the wheel has been turned through a predetermined arc, say one revolution, gives a direct indication of how much and in which direction the wheel is running out of line. The operator then applies corrective measures to the automobile mechanism and tests again until both wheels run in true alignment.

The operating parts of my gauging device are so lightly loaded that they respond to the slightest pressure—therefore the device gives accurate indications of the slightest inaccuracy of alignment.

Figure 2:
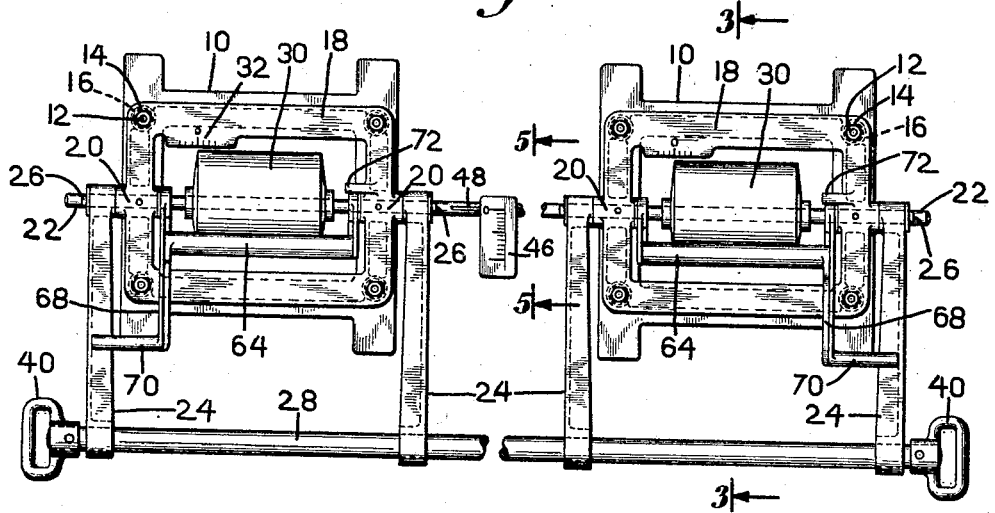
Fig. 2 is an enlarged top view of the device.

In order to move the tire temporarily out of contact with drum 30 without manipulating the jack, I provide a relieving bar 64 supported parallel to shaft 22 and just free of the outer surface of drum 30, by arms 66 pivotally mounted on shaft 22 inside bosses 20 (Figs. 3 and 4). At one end of bar 64 is a bent arm 68 provided with a handle portion 70 (Fig. 2). Normally, bar 64 is in the position shown in Fig. 3, with handle 70 resting on top of a connecting rod 24. If bar 64 is raised to the position shown in Fig. 4 the tire of wheel 38 is freed from contact with roller 30 and the roller may be reset to zero position. Bar 64 may be moved either by grasping handle 70, or by means of connecting rod 24. If bar 28 be raised by handles 40 on both sides of the car, both bars 64 will be raised simultaneously.

A stop 72 fast to cradle 18 is provided, against which one arm 66 will rest if the arms pass the vertical center line. This permits the operator to leave bar 64 in position above roller 30 without holding it by hand.

It is to be understood that the invention is not limited to the construction herein specifically illustrated but can be embodied in other forms without departure from its spirit as defined by the following claims.

I claim—

1. In an apparatus for gauging the running alignment of an automobile wheel having a tire, in combination, a drum, a shaft for supporting said drum for free rotative and axial movement, means for raising and holding said drum in contact with the tire on a raised wheel to be gauged whereby said drum will be rotated when the wheel is rotated and whereby said drum will travel axially on said shaft if the wheel is out of running alignment.

2. The invention set forth in claim 1 in which the means for raising and holding said drum in contact with the tire is resilient.

3. In an apparatus for gauging the running alignment of a raised automobile wheel having a tire, in combination, a drum, means independent of the wheel support for supporting said drum for free rotative and axial movement, resilient means for maintaining said drum in contact with the tire on the wheel to be gauged whereby said drum will be rotated when the wheel is rotated and whereby said drum will travel axially on said shaft if the wheel is out of running alignment.

4. In an apparatus for gauging the running alignment of an automobile wheel having a tire, in combination, a drum, means for supporting said drum for free rotation and axial movement, said wheel being supported by the axle of the automobile above the drum and independently thereof and having its tire in contact with the drum, and means for indicating the fore and aft position of the wheel axis relatively to the drum axis, said indicating means comprising a graduated chart supported by said drum, supporting means and a pointer cooperating with said chart, said pointer being pendently supported above the chart by the automobile axle.

5. In an apparatus for gauging the running alignment of an automobile wheel mounted for rotation on an axle of the automobile, a support, a movable drum carried by the support and adapted for actuation by the rim of the wheel when rotated for indicating the alignment or misalignment of the wheel, and means for pressing said drum into operative engagement with the wheel rim, said pressing means being adjustable at the will of the operator to regulate the pressure.

6. In an apparatus for gauging the running alignment of an automobile wheel having a tire, in combination, a movable member adapted to be brought into contact with the tire of a wheel supported above and independently of said member, and manually operable means associated with said member for temporarily breaking said contact whereby said member may be moved without moving the wheel.

7. The invention set forth in claim 6 in which said manually operable means comprises a bar insertable between said wheel and said device out of contact with said device.

8. In an apparatus for gauging the running alignment of an automobile wheel having a tire, in combination, a movable device, resilient means for normally supporting said device in contact with said tire, and means operable against said tire and upon said resilient means for temporarily breaking said contact whereby said device may be movable without moving said wheel.

9. In an apparatus for gauging the running alignment of an automobile wheel supported for rotation on an axle of said automobile and having a tire, an indicating drum in contact with said tire, a shaft supporting said drum for rotation and manually operable means for temporarily breaking said contact without moving said axle.

10. In a gauging apparatus, for an automobile wheel supported above the ground, means for indicating the alignment or misalignment of the wheel which comprises a member having a surface movable in two directions under the action of the wheel when rotated, and means for raising and holding said member in engagement with the wheel whereby rotation of the wheel through a predetermined arc causes said member to move to a position indicating the amount of misalignment of the wheel.

11. In a gauging apparatus, for an automobile wheel supported above the ground, means for indicating the alignment or misalignment of the wheel which comprises a member having a surface movable in two directions under the action of the wheel when rotated, and resilient means for raising and holding said member in engagement with the wheel whereby rotation of the wheel through a predetermined arc causes said member to move to a position indicating the amount of misalignment of the wheel.

12. In a gauging apparatus, for an automobile wheel supported above the ground, means for indicating the alignment or misalignment of the wheel which comprises a member having a surface movable in two directions under the action of the wheel when rotated together with means for moving said member to break said engagement and permit of the restoration of said member to normal position irrespective of the movement of the wheel.

13. In a gauging apparatus for an automobile wheel supported above the ground, means for indicating the alignment or misalignment of the wheel which comprises a support, a member mounted on said support and having a surface movable in two directions under the action of the wheel, means acting upon the support to raise and hold the member in engagement with the wheel and a member pivoted to the support and constructed to be interposed between the member and the wheel to break the engagement of the member with the wheel whereby the member can be restored to normal position independently of the movement of the wheel.

14. In a gauging apparatus for an automobile wheel supported above the ground, means for indicating the alignment or misalignment of the wheel which comprises a support, a member mounted on said support and having a surface movable in two directions under the action of the wheel, resilient means acting upon the support to raise and hold the member in engagement with the wheel and a member pivoted to the support and constructed to be interposed between the member and the wheel to depress the support against the action of the resilient means and break the engagement of the member with the wheel whereby the member can be restored to normal position independently of the movement of the wheel and constructed to depress the support against the action of the resilient means and be interposed between the wheel and member to break the engagement between the wheel and member whereby the member may be restored to normal independently of the action of the wheel.

15. In a gauging apparatus, for an automobile wheel supported above its normal running surface, means for determining the alignment or misalignment of said wheel comprising a member having a surface movable in two directions under the action of the wheel, a support for said member, means acting upon the support to press said member in engagement with the wheel, and means carried by said support and automobile to indicate when the axis of said member and the axis of the wheel are in the same vertical plane.

16. In a gauging apparatus, for an automobile wheel supported above its normal running surface, means for determining the alignment or misalignment of said wheel comprising a member having a surface movable in two directions under the action of the wheel, a support for said member, means acting upon the support to press said member in engagement with the wheel, a chart carried by said support and a plumbing device carried by the automobile and co-operating with said chart to indicate when the axis of said member and the axis of the wheel are in the same vertical plane.

17. In an apparatus for simultaneously gauging the running alignment of the raised front wheels of an automobile, two drums, a pair of aligned spaced-apart shafts for supporting said drums for free rotative and axial movement, means for raising and holding said drums in contact with the rims of the wheels to be gauged whereby when the wheels are rotated each drum will be rotated and whereby each drum will travel axially on its shaft if its associated wheel is out of running alignment, in combination with means out of alignment with said shafts for holding said shafts in alignment whereby space is provided between said shafts to accommodate a lifting jack.

18. The invention set forth in claim 17 in which said last named means comprises a third shaft parallel to said pair of shafts, and equal-length links connecting said third shaft to the ends of said pair of shafts, substantially as described.

In testimony whereof I hereto affix my signature.

GEORGE H. TABER.